United States Patent [19]

Irving et al.

[11] Patent Number: 4,776,992
[45] Date of Patent: Oct. 11, 1988

[54] PROCESS FOR PRODUCTION OF MOLDED COMPOSITES

[75] Inventors: Edward Irving, Burwell; Terence J. Smith, Royston, both of England

[73] Assignee: Ciba-Geigy Corporation, Ardsley, N.Y.

[21] Appl. No.: 888,914

[22] Filed: Jul. 25, 1986

[30] Foreign Application Priority Data

Aug. 7, 1985 [GB] United Kingdom ............... 8519778

[51] Int. Cl.$^4$ .............................................. B29C 35/08
[52] U.S. Cl. .................................... 264/22; 264/137; 264/255; 264/258; 264/338; 522/25; 522/100; 522/913
[58] Field of Search ................. 264/22, 255, 257–258, 264/338, 137; 522/25, 100, 913

[56] References Cited

U.S. PATENT DOCUMENTS

| | | | |
|---|---|---|---|
| 3,848,045 | 11/1974 | Oswitch et al. | 264/255 |
| 4,097,569 | 6/1978 | Waters | 264/255 |
| 4,242,415 | 12/1980 | Feltzin et al. | 264/255 |
| 4,338,269 | 7/1982 | Russell | 264/22 |
| 4,350,739 | 9/1982 | Mohiuddin | 264/255 |
| 4,367,192 | 1/1983 | Arnason | 264/255 |
| 4,414,173 | 11/1983 | Cobbledick et al. | 264/255 |

FOREIGN PATENT DOCUMENTS 3140316 10/1983 Fed. Rep. of Germany .

*Primary Examiner*—Jeffery Thurlow
*Attorney, Agent, or Firm*—Luther A. R. Hall

[57] ABSTRACT

Coated, reinforced composites are prepared by a process in which
(i) a liquid composition comprising a photocurable residue and a residue having at least one epoxide group or phenolic hydroxyl group is applied to the surface of a mould,
(ii) the composition is exposed to actinic radiation until it solidifies,
(iii) reinforcement and a thermosettable composition are applied to the solidified layer, this composition containing an epoxide resin or a phenolic resin,
(iv) the assembly is heated to form a cured moulding, and
(v) the moulding is removed from the mould.

The composition used in the first stage may be a mixture of a photocurable resin and an epoxide or phenolic resin, or a dual-functional resin having, in the same molecule, at least one photocurable group and at least one epoxide or phenolic hydroxyl group, which resin photocures in stage (ii) to produce a thermosettable resin, or it may be an epoxide resin or a phenolic resin together with a curing agent that is activated by heat and one that is activated by actinic radiation.

19 Claims, No Drawings

PROCESS FOR PRODUCTION OF MOLDED COMPOSITES

This invention relates to moulded reinforced composites having a coating on at least one side, and to a process for their manufacture.

Moulded reinforced composites are conventionally made by applying layers of a resin, and its hardener, typically a polyester resin and a peroxide hardener, and a reinforcement, which may be a powder, flake, or preferably a fibre, typically a glass fibre, into an appropriate mould, leaving the resin to cure, and removing the resultant cured composite. The surfaces of such mouldings tend to have imperfections where the reinforcement forms part of the surface. To prevent such imperfections and thus obtain a perfectly smooth surface, it is conventional practice to apply a layer of the resin without reinforcement to the surface of the mould and to allow that resin to solidify (gel) before application of the remainder of the resin with the reinforcement. This method of obtaining an unblemished surface to the composite is termed gel-coating.

Moulded composites made in this way are limited in their mechanical properties due to the need to use a resin that cures rapidly at room temperature. When better mechanical properties are required, a phenolic or epoxide resin may be used. These resins cure only slowly when mixed with a curing agent and left at room temperature, and so it is usual practice to heat the resin in the mould, thus effecting cure within a few minutes. It is, of course, possible to apply a gel coat that cures rapidly at room temperature, for example of polyester resin, and, once gelation has occurred, to apply the phenolic or epoxide resin, together with the reinforcement. Such a method suffers as a result of the chemical disparity between the coating and the body of the moulding. When subjected to physical or mechanical shock, the coating tends to crack or even to separate from the body of the moulding. There is therefore a strong preference to use a heat-curable phenolic or epoxide resin gel coat when the body of the moulding is a phenolic or epoxide resin, respectively.

The incorporation of such mechanically strong gel coats is not without its own difficulties. After application of the coating resin to the mould it must be heated to effect gelation, since reinforcement and further resin cannot be applied until the gel coat has hardened or the reinforcement will penetrate the coating and damage the final surface. In order to obtain a reasonably thick gel coat it is usual to apply a formulation that contains additives to give it thixotropy. However many such additives allow thixotropic compositions to flow when they are heated, and this, in turn, causes areas of the gel coat to be thicker than desired and other areas thinner than desired. The formulation of heat-cured gel coats is not a simple matter, requiring as it does precise knowledge of application conditions, cure conditions, and even mould shape.

There is a further difficulty that must be overcome in the processing of a heat cured gel coat. The coating and the mould to which it is applied must be heated for a sufficient period to effect gelation of the resin. They must then be cooled before the layers of resin and reinforcement are applied, otherwise some premature gelation of this resin may occur. Once the lay up is complete the whole assembly is heated once more. Such a process is not only expensive in the cost of heating what are often large metal moulds, but further, the heating-cooling-heating cycle is very time consuimg, which increases the cost of each moulding. There is therefore a need for a method of obtaining mechanically strong, gel-coated composites in which the coating is firmly bonded to the reinforced body of the moulding and that do not require double heating of the mould and resin.

It has now been found that this object can be achieved by applying as the gel coat a layer of a composition that is both photocurable and thermosettable, or a composition which becomes thermosettable on photocure, the thermosettable portion being an epoxide resin or a phenolic resin. The reinforced resin is solely thermosettable and is preferably of the same type as the thermosettable portion of the gel coat. This gel coat is solidified rapidly by ultraviolet radiation and, in this solidified state, it resists damage caused by contact with the reinforcement. It is still heat curable however. When the whole assembly is heated, usually under pressure, the thermosettable resin will flow to a limited extent prior to cure. This causes intermingling of the gel coat resin and the reinforced resin at their interface so that, once cure is complete, no separation of the gel coat is possible unless the physical or mechanical shock is so great that the reinforced resin is also damaged. Since only one heating stage is necessary the process is economical and is not particularly time-consuming.

The use of photopolymerisation to achieve hardening of a gel coat is known. In West German Patentschrift No. 3 140 316 there is described a process in which a gel coat is precured by irradiation and then a thermosetting material is applied and cured. The coating preferably contains some electrically-conductive material and it is stated that no release agent is required on the mould face. Only unsaturated materials are described as being suitable for the process, typically acrylates and polyesters. The gel coat is cured completely by irradiation, and the second resin is then applied, together with a suitable curing agent, and cure takes place at room temperature. The fact that the gel coat is completely cured before application of the second resin means that the bond between these layers is dependent almost entirely upon the adhesive strength of the second resin and cannot be as strong a bond as is obtained when some chemical interaction at the resins' interface occurs. Physical or mechanical shock may therefore cause separation of the gelled coating.

This invention therefore provides a process for the production of a coating, reinforced epoxide or phenolic moulding which comprises
  (i) applying to the surface of a mould a layer of a liquid composition comprising a photocurable residue and a residue having at least one epoxide group or phenolic hydroxyl group,
  (ii) exposing the said layer to actinic radiation until solidification occurs, thereby forming on said surface a solidified layer having a thermosettable residue which is an epoxide or phenolic resin,
  (iii) applying to the solidified layer, in either order or simultaneously, at least one layer of reinforcement and at least one layer of a thermosettable resin that is an epoxide resin or a phenolic resin,
  (iv) heating the assembly to form a cured moulding and
  (v) removing the cured moulding from the mould.

The composition used in the gel coat may comprise a solely photocurable resin with a solely thermosettable epoxide or phenolic resin; a dual functional material, i.e.

a resin having, in the same molecule, at least one photocurable group and at least one epoxide or phenolic hydroxyl group, which resin photocures in stage (ii) to produce a thermosettable resin; a mixture of a said dual-functional resin and a solely photocurable resin and/or a solely thermosettable epoxide or phenolic resin; or an epoxide resin or a phenolic resin together with a curing agent that is activated by heat and a curing agent that is activated by actinic radiation.

The thermosettable resin used in stage (i), or produced in stage (ii) by photocure of a dual-functional resin, may be the same as, or different from, the resin used in stage (iii). Preferably the resins are of the same type, i.e. if an epoxide resin is used in stage (i), or produced in stage (ii) by photocure of a compound containing one epoxide group and one or more photocurable groups, then an epoxide resin is used in stage (iii). Likewise, if a phenolic resole is used in stage (i) then a phenolic resole is used in stage (iii).

Photocurable resins used in the present process are preferably those having at least one unsaturated ester group of formula

    I where
R$^1$ represents a hydrogen, chlorine, or bromine atom or an alkyl group of 1 to 4 carbon atoms, especially a hydrogen atom or a methyl group.

Usually the photocurable resin has at least two groups of formula I and a molecular weight of at most 10000. These groups may be attached to an aliphatic, aromatic, araliphatic, cycloaliphatic, or heterocyclic residue. Suitable photocurable resins include acrylates and methacrylates of monohydric alcohols, such as 2-methoxyethanol, tetrahydrofurfuryl alcohol, and cyclohexanol, and full and partial esters of acrylic and methacrylic acid with glycols such as ethylene glycol, propylene glycol, 1,4-butane diol, neopentylene glycol, diethylene and dipropylene glycols, triethylene and tripropylene glycols, tetraethylene glycol and higher polyoxyalkylene glycols, and higher functional polyols such as trimethylolpropane, polyoxyalkylene triols and pentaerythritol. These acrylates and methacrylates may be halogen-substituted. Also suitable as the photocurable resin are acrylates and methacrylate esters of substituted monohydric alcohols, such as 2-cyanoethanol, 2-chloroethanol, 2-bromoethanol, and 2-isocyanatoethanol.

Also suitable as the photocurable resin are 2-hydroxypropyl esters, formed by reaction of a compound containing one or more glycidyl groups, especially a mono- or polyglycidyl ether of a mono- or polyhydric alcohol or phenol or a N-glycidylhydantoin, with acrylic or methacrylic acid. Other suitable photocurable resins are esters formed by reaction of a diepoxide or other polyepoxide with an equivalent amount of an adduct of a hydroxyalkyl acrylate or methacrylate with a saturated or unsaturated dicarboxylic acid anhydride such as succinic, maleic, or phthalic anhydride. Typical such compounds include 1,4-bis(2-hydroxy-3-acryloyloxypropoxy)butane, a poly(2-hydroxy-3-acryloyloxypropyl)ether of a bisphenol or a phenol-formaldehyde novolak, 2,2-bis(4-(2-hydroxy-3-(2-acryloyloxyethoxy)-succinyloxypropoxy)phenyl)propane, 1-(2-hydroxy-3-acryloyloxypropoxy)butane, -octane, and -decane, bis(2-hydroxy-3-acryloyloxypropyl)adipate, 2-hydroxy-3-acryloyloxypropyl propionate, and 3-phenoxy-2-hydroxypropyl acrylate, and the corresponding methacrylates.

Other photocurable compositions that may be used in step (i) of the new process are phenolic resins or epoxide resins together with a curing agent for these that is activated by actinic radiation, particularly an aromatic iodonium, sulphonium, sulphoxonium, or iodosyl salt or a ferrocenium salt. Suitable anions for such salts include boron, arsenic, antimony or phosphorus fluorides and, when a phenolic resin is used, they may further be halides, sulphates, or sulphonates.

Suitable phenolic resins that may be used in the gel coat and, with the reinforcement, may form the body of the moulding, are resoles and novolaks prepared by reaction of a mono- or polhydric phenol, such as phenol itself, a cresol, bisphenol A, or resorcinol, with an aldehyde such as formaldehyde. Preferred phenolic resins are resoles and novolaks derived from phenol and formaldehyde.

Suitable epoxide resins that may be used in the gel coat and, with the reinforcement, may form part of the body of the moulding, include polyglycidyl esters obtainable by reaction of a compound containing two or more carboxylic acid groups per molecule with epichlorohydrin or glycerol dichlorohydrin in the presence of an alkali. Such glycidyl esters are preferably derived from aliphatic polycarboxylic acids, e.g., succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methyl-hexahydrophthalic acid; and from aromatic polycarboxylic acids such as phthalic acid, isophthalic acid, and terephthalic acid.

Other suitable epoxide resins are polyglycidyl ethers obtainable by reaction of a compound containing two or more free alcoholic hydroxyl and/or phenolic hydroxyl groups per molecule with epichlorohydrin under alkaline conditions or, alternatively, in the presence of an acidic catalyst and subsequent treatment with alkali. These ethers may be made from acyclic alcohols such as ethylene glycol, poly(oxyethylene)glycols, propane-1,2-diol, poly(oxy propylene)glycols, propane-1,3-diol, butane-1,4-diol, poly(oxytetramethylene)glycols, glycerol, pentaerythritol, and poly(epichlorohydrin). They may also be made from mononuclear phenols, such as resorcinol and from polynuclear phenols, such as bis(4-hydroxyphenyl)methane, 4,4'-dihydroxydiphenyl, bis(4-hydroxyphenyl)sulphone, 1,1,2,2-tetrakis(4-hydroxyphenyl)ethane, 2,2-bis(4-hydroxyphenyl)propane (otherwise known as bisphenol A), 2,2-bis(3,5-dibromo-4-hydroxyphenyl)propane, and novolaks formed from aldehydes such as formaldehyde with phenols.

Further suitable epoxide resins are poly(N-glycidyl) compounds including, for example, those obtained by dehydrochlorination of the reaction products of epichlorohydrin with amines containing at least two amino-hydrogen atoms, such as aniline, n-butylamine, and bis(4-aminophenyl)methane; triglycidyl isocyanurate; and N,N'-diglycidyl derivatives of cyclic alkylene ureas, such as ethyleneurea, and of hydantoins such as 5,5-dimethylhydantoin.

Especially preferred epoxides used in the process of this invention are diglycidyl ethers, which may have been advanced, of dihydric phenols such as 2,2-bis(4-hydroxyphenyl)propane and bis(4-hydroxyphenyl)methane and of dihydric alcohols such as butane 1,4-diol, polyglycidyl ethers of phenol-formaldehyde and bisphenol A-formaldehyde novolaks and N-glycidylated aromatic amines, such as N,N,N',N'-tetraglycidyl-4,4'-diaminodiphenylmethane and N,N,O-triglycidyl-4-aminophenol.

As previously mentioned, the liquid composition used in stage (i) may also comprise a resin having, on the same molecule, at least one photocurable group and at least one epoxide or phenolic hydroxyl group. Such dual-functional resins preferably have at least one 1,2-epoxide group or phenolic hydroxyl group and at least one substituted ester group of formula I, those having 1 or 2 1,2-epoxide groups and 1 to 6 groups of formula I being particularly preferred.

Typical such compounds are those of formula

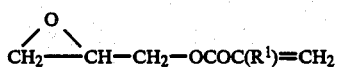
II

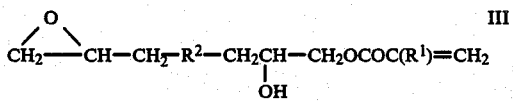
III and

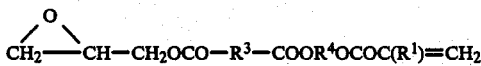
IV where $R^1$ is as hereinbefore defined, $R^2$ represents the residue of a di or polyglycidyl compound after the removal of two glycidyl groups, $R^3$ represents the residue of a di or polycarboxylic acid after the removal of two carboxylic acid groups, and $R^4$ represents an alkylene chain of from 1 to 6 carbon atoms.

Suitable such residues $R^2$ include dihydric phenol, especially bisphenol, residues after removal of the two phenolic hydrogen atoms, glycol residues after removal of the two alcoholic hydrogen atoms, and aromatic amine residues after removal of the two amino hydrogen atoms. Suitable residues $R^3$ are saturated or unsaturated aliphatic or aromatic dicarboxylic acid residues and aromatic tri- or tetracarboxylic acid residues, after removal of two carboxylic acid groups, such as succinic, malonic, maleic, phthalic, trimellitic and pyromellitic acid residues. Suitable alkylene groups $R^4$ are ethylene, propylene, and butylene groups.

Suitable dual functional compounds may be made by introducing a group of formula I into a compound which already contains one or more 1,2-epoxide groups or, conversely, by introducing one or more 1,2-epoxide groups into a compound that already contains one or more groups of formula I.

A convenient method of introducing groups of formula I into a compound that already contains epoxide groups to produce, for example, a compound of formula III comprises reaction of an at least diepoxide with a stoichiometric deficit, based on the epoxide group content, of a compound containing both a group of formula I and also a group, such as carboxylic acid, phenolic or alcoholic hydroxyl, or imido group, capable of reaction with a 1,2-epoxide group so as to introduce at least one group of formula I into the molecule. Suitable polyepoxides include those mentioned above as suitable for use as the thermosettable resin.

It will be understood that this method will not usually give rise to a 100% yield of material containing, on the same molecule, both a 1,2-epoxide group and an acrylate group of formula I. The other material in the product comprises a mixture of unchanged starting material containing the original number of epoxide groups, and material in which all epoxide groups have been replaced by groups of formula I. However, since such mixtures may be successfully used in the present process, the fact that the reaction product is a mixture is of no consequence.

Another method of making dual functional compounds for example, those of formula II, by introducing an epoxide group or groups into a compound having at least one group of formula I, comprises using as the latter a compound which has also at least one alcoholic hydroxyl, or a carboxyl, group, and treating it such that the group or groups is or are converted into 1,2-epoxide groups, using methods known in the art of epoxide resins for converting hydroxyl or carboxyl groups into glycidyl ether or ester groups. For example, the compound is caused to react with epichlorohydrin in the presence of a hydrogen chloride acceptor (usually a strong base, e.g., NaOH and preferably of a catalyst such as a quaternary ammonium compound, a tertiary amine, a transition metal salt, a thioether, or a sulphonium salt. Usually an excess of epichlorohydrin over the theoretical quantity required is employed, the excess serving as solvent for the reaction, which is normally carried out at a temperature of 30° to 120° C., preferably 40° to 65° C., and usually under reduced pressure in order to remove the water formed during the reaction.

A convenient method of making dual functional compounds such as those of formula IV comprises converting a hydroxy-substituted compound containing a group of formula I into a half-ester by reaction with a polycarboxylic acid anhydride. The free carboxylic acid group(s) may then be glycidylated, following the method outlined above, or may be esterified by treatment with a compound containing two or more epoxide groups, usually at 60° to 120° C. in the presence of a strong base and a catalyst such as a quaternary ammonium compound, or a transition metal salt.

Compounds containing both a phenolic resin residue and an unsaturated group of formula I are prepared by reaction of the phenolic resin, containing more than one phenolic hydroxyl group or hydroxyalkyl group per average molecule, with an unsaturated acid containing a group of formula I, preferably acrylic or methacrylic acid, or a reactive derivative of these, particularly the chloride or glycidyl ester.

Typical dual functional compounds are glycidyl acrylate, glycidyl methacrylate, 2-(4-glycidyloxyphenyl)-2-(4-(3-acryloyloxy-2-hydroxypropoxy)phenyl)propane, 2-(4-(glycidyloxyphenyl)-2-(4-(2-hydroxy-3-methacryloyloxy)propoxy)phenyl)propane, 1-(2-methacryloyoxyethoxycarbonyl)-2,4- and 2,5-bis(glycidyloxycarbonyl)benzene, 1-(2-acryloyloxyethoxycarbonyl)-2,4- and 2,5-bis(glycidyloxycarbonyl)benzene, 2-acryloyloxyethoxy glycidyl succinate, 2-methacryloyloxyethoxy glycidyl succinate, 1-glycidyl-3-(3-acryloyloxy-2-hydroxypropyl)-5,5-dimethylhydantoin, 1-glycidyl-3-(2-hydroxy-3-methacryloyloxy)propyl)-5,5-dimethylhydantoin, 1-glycidyloxy-4-(3-acryloyloxy-2-hydroxypropyloxy)butane, 1-glycidyloxy-4-(2-hydroxy-3-methacryloyloxypropyloxy)butane, and the reaction product of a phenolformaldehyde resole with half the stoichiometric amount of acryloyl or methacryloyl chloride or of glycidyl acrylate or glycidyl methacrylate.

One or more components of the liquid composition can be solid, provided that the mixture is liquid. The viscosity of the composition preferably lies within the range 0.1 to 50 Pa s. In order to achieve this viscosity range, monoepoxides may be included in the composition instead of, or in addition to, low viscosity acrylates and methacrylates selected from the acrylates and methacrylates described above. Suitable monoepoxides include n-butyl glycidyl ether, 2,2,4-trimethylpentyl glycidyl ether (isooctyl glycidyl ether) and phenyl glycidyl ether.

The weight ratio of photocurable residue to epoxide or phenolic resin residue in the liquid composition is not critical as long as effective amounts of both are present. Where the epoxide or phenolic resin residue and the photocurable residue are on separate molecules, the weight ratio of epoxide or phenolic resin to photocurable material is generally within the range 0.2:1 to 15:1, preferably from 1:1 to 10:1.

Preferably the liquid composition is irradiated in the presence of a suitable catalyst which, on irradiation, gives an excited state that leads to formation of free radicals which then initiate polymerisation of the monomer.

Suitable such catalysts include alpha-halogen substituted acetophenones such as 2,2,2-trichloro-4'-tert-.butylacetophenone, benzophenones, O-alkoxycarbonyl derivatives of an oxime of benzil or 1-phenylpropane-1,2-dione, such as benzil (O-ethoxycarbonyl)alpha-monoxime and 1-phenylpropane-1,2-dione-2-(O-ethoxycarbonyl)oxime, benzil ketals, e.g., benzildimethyl ketal, and mixtures of phenothiazine dyes (e.g., methylene blue) or quinoxalines (e.g., metal salts of 2-(m- or p-methoxyphenyl)quinoxaline-6'- or 7'-sulphonic acids) with electron donors such as sodium benzenesulphinate or other sulphinic acid or a salt thereof, an arsine, a phosphine, or thiourea (photoredox systems). Also suitable are titanocenes such as bis(pi-cyclopentadienyl)bis (sigma pentafluorophenyl)titanium (IV). Benzildimethyl ketal is an especially preferred photoinitiator.

Generally 0.01 to 20%, and preferably 0.5 to 15% by weight, of photopolymerisation catalyst is incorporated, based on the weight of the liquid composition.

Curing agents for the epoxide resin or the phenolic resin are well known and are selected according to the nature of the resin and the properties required in both the cured and the uncured resin. When a phenolic resole is used cure may be effected by heating without any added curing agent or it may be effected in the presence of an acidic curing agent such as phosphoric acid, sulphric acid, methane sulphonic acid, p-toluene sulphonic acid, xylene sulphonic acid, or hydrochloric acid. When a phenolic novolak is employed a formaldehyde donor must be incorporated, preferably hexamethylene tetramine.

Curing agents for epoxide resins suitable for use in the process of the present invention, include polycarboxylic acids and their anhydrides, especially aromatic acids and anhydrides such as pyromellitic acid, pyromellitic anhydride, trimellitic acid, trimellitic anhydride, and phthalic anhydride, aliphatic, cycloaliphatic and heterocyclic primary, secondary, or tertiary amines, including aliphatic polyamines such as ethylene diamine, hexamethylene diamine, and N,N-dimethylpropylene-1,3-diamine, polyalkylene polyamines such as diethylene triamine, triethylene tetramine and tetramethylenepentamine, alkanolamines such as ethanolamine, diethanolamine, triethanolamine and N-(2-hydroxyethyl)diethylenetriamine, cycloaliphatic polyamines such as bis(4-aminocyclohexyl)methane and isophoronediamine, heterocyclic polyamines such as N-(2-aminoethyl)piperazine, and polyamino amides such as reaction products of aliphatic polyamines with dimerised and trimerised unsaturated fatty acids.

Other curing agents include aromatic primary and secondary amines, for example, phenylene diamines, substituted phenylene diamines such as 2,4- and 2,6-diethyl-3,5-diaminotoluene, bis(aminophenyl)methanes such as bis(4-aminophenyl)methane, bis(aminophenyl)-sulphones such as bis(4-aminophenyl)sulphone, and bis(aminophenyl)ketones such as bis(4-aminophenyl)ketone; imidazole and substituted imidazoles such as 2-methylimidazole, 2-phenylimidazole, 1-benzyl-2-methylimidazole and 1-cyanoethyl-2-methylimidazole; amides including substituted ureas, especially aromatic group-substituted ureas such as N-(4-chlorophenyl)-N',N'-dimethylurea, N-(2-hydroxyphenyl)-N',N'-dimethylurea, N-(3-chloro-4-methylphenyl)-N',N'-dimethylurea and 2,4-bis(N,N-dimethylureidoa)toluene; amidines such as dicyandiamide and 1-cyano-3-(lower alkyl)guanidines, for example the 3-methyl, 3,3-dimethyl or 3,3-diethyl compounds; and complexes of boron trifluoride or trichloride with an aliphatic, cycloaliphatic or heterocyclic amine, particularly trimethylamine or octyldimethylamine.

Conventional accelerators for the abovementioned epoxide resin-curing agents may be used.

The reinforcement may be any solid material conventionally used in the preparation of reinforced composites. Such material may be in powdered, flaked, or, preferably fibrous form. Particularly preferred fibres are those of cotton, glass, carbon, boron, asbestos, or of metals such as steel or aluminum. These fibrous materials may be added as loose fibres or as woven or nonwoven fabrics and may be pre-impregnated with the thermosettable resin.

The liquid composition may be applied to the surface of the mould by any known method, for example, by spraying, brushing or rolling. The thickness of this coating is typically 1-250 micrometers. As is conventional practice with the application of gel coats, the surface of the mould is preferably treated, before application of the resin, with a mould release agent.

In the photopolymerisation stage of the process of this invention actinic radiation of wavelength 200-600 nm is preferably used. Suitable sources of actinic radiation include carbon arcs, mercury vapour arcs, fluorescent lamps with phosphors emitting ultraviolet light, argon and xenon glow lamps, tungsten lamps, and photographic flood lamps. Of these, mercury vapour arcs, particularly sun lamps, fluorescent sun lamps, and metal halide lamps are most suitable. The time required for the exposure will depend upon a variety of factors which include, for example, the individual compounds used, the type of light source, and the distance of that source from the irradiated composition. Suitable times that give to the coating sufficient hardness to resist damage by the reinforcement when heated under pressure may be readily determined by those familiar with photopolymerisation techniques.

The invention will now be illustrated by reference to the following Examples in which all parts and percentages are by weight.

The resins used in these Examples are as follows:

Resin I

This denotes an epoxide resin prepared by advancing bisphenol A diglycidyl ether by reaction with bisphenol A using sodium hydroxide as catalyst and having an epoxide content of 1.4 equivalents/kg.

Resin II

This denotes a glycidylated phenol-formaldehyde novolak having an epoxide content of 5.6 equivalents/kg and a viscosity at 50° C. of 40 Pas.

Resin III

This denotes 1,4-butanediol dimethacrylate.

Resin IV

This denotes glycidyl methacrylate.

Resin V

This denotes bis(4-(N,N-diglycidylamino)phenyl)methane, having an epoxide content of 7.5 equivalents/kg.

Resin VI

This denotes 2,2-bis(4-glycidyloxyphenyl)propane, having an epoxide content of 5.2 equivalents/kg.

Resin VII

A mixture of 80% phenol (208.3 parts), 38.3% formalin (222.2 parts), and zinc acetate (19.4 parts) is heated under reflux for 2½ hours, then allowed to cool. The mixture is separated into two layers and the aqueous layer is removed, leaving a phenol formaldehyde resole having a viscosity at 25° C. of 0.4 Pa s.

This resole (100 parts) is mixed with tetramethyl ammonium chloride (0.199 parts) and 2,6-ditertiary butyl-4-methylphenol (0.266 parts) and heated to 80° C. Glycidyl methacrylate (46.1 parts) is added dropwise over 1 hour, and the mixture is then heated at 80° C. for a further 8½ hours. The mixture is cooled to give Resin VII, which has a viscosity at 25° C. of 1.44 Pa s.

Resin VIII

This denotes dibromoneopentyl glycol dimethacrylate, supplied by Shin-Nakamuro Chemical Co. Ltd., Wakayama, Japan.

Resin IX

This denotes a phenol formaldehyde resole having the following properties: phenol:formaldehyde molar ratio=1:1.4; specific gravity=1.225; solids content=76%; viscosity at 25° C.=0.8 Pa s.

Resin X

This denotes a glycidylated bisphenol A-formaldehyde novolak having a softening point of 72° C. and an epoxide content of 4.7 equivalents/kg.

Resin XI

This denotes a resin prepared by evaporating all the water from a phenol-formaldehyde resole having a phenol:formaldehyde molar ratio of 1:1.8, a viscosity at 25° C. of 6-8 Pa s, a solids content of 81.5-85.5% and a pH of 8.0-9.0.

Resin XII

This denotes 1,1,1-trimethylolpropane trismethacrylate.

EXAMPLE 1

Resin I (60.8 g) and Resin II (206.6 g) are heated together to 120° C. and to the fused mass are added Resin III (100.0 g), Resin IV (20.4 g) and benzil dimethyl ketal (42.5 g). The mixture is allowed to cool to 60° C. and Resin V (40.5 g) is added.

In a separate vessel, Resin VI (36.5 g), Resin III (21.5 g), dicyandiamide (21.9 g), and N-(4-chlorophenyl)-N',N'-dimethyl urea (21.9 g) are mixed and the mixture is then passed through a triple roll mill. The two mixtures are combined and brushed onto a metal mould, previously coated with a silicone release agent, giving a coating 4 to 6 micrometers thick. The coating is irradiated for 0.6 seconds under a 80 w/cm medium pressure mercury arc lamp at a distance of 90 mm. The resultant coating is hard and tack-free.

To this coating are applied two layers of a prepreg containing 42% of an epoxide resin formulation on a sized square woven glasscloth weighing 200 g per square meter. The resin formulation contains Resin VI (55 parts), Resin VI advanced with bisphenol A to an epoxide content of 0.3 equivalents/kg (45 parts), dicyandiamide (14 parts), and N-(3-chloro-4-methylphenyl)-N',N'-dimethylurea (7 parts). The assembly is covered with a poly(tetrafluoroethylene) sheet and a vacuum applied to hold the sheet onto the layers. It is heated in an oven at 130° C. for 1 hour and separated from the mould, giving a cured, rigid moulding from which the coating cannot be removed.

EXAMPLE 2

Resin VII (100 parts), Resin VIII (10 parts) and benzil dimethyl ketal (2 parts), are mixed at room temperature to give a clear solution. This is brushed onto one surface of a metal mould, previously coated with a silicone release agent, leaving a layer 15-30 micrometers in thickness. This layer is exposed for 2 minutes to radiation from a 400 w metal halide lamp, emitting mainly at 365 nm, the distance between the lamp and the coating being 20 cm. This exposure hardens the coating.

Two layers of continuous filament glass mat, Vetrotex Unifilo U814, are placed on the hardened coating and the mould is closed. (The words 'Vetrotex' and 'Unifilo' are registered trademarks). A mixture of Resin IX (100 parts), xylene sulphonic acid (6.2 parts), 81% phosphoric acid (1.0 part), and water (0.8 part) is pumped into the closed mould which is then heated at 60° C. for 5 minutes. The mould is opened and the resultant moulded article is removed. The article has a completely smooth and perfect coating on one side, that cannot be removed by physical attack.

EXAMPLE 3

Resin I (60.75 g) and Resin X (103.28 g) are heated together at 120° C. and to the resulting fused mass are added Resin II (103.28 g), Resin III (100.00 g), Resin IV (20.38 g) and benzil dimethyl ketal (42.45 g). The mixture is allowed to cool to 80° C. and Resin V (40.50 g) is added.

In a separate vessel, Resin VI (72.90 g), Resin III (43.00 g), dicyandiamide (43.74 g) and N-(4-chlorophenyl)-N',N'-dimethylurea (43.74 g) are mixed and the mixture is passed through a triple roll mill.

The two mixtures are combined and brushed onto a metal mould which has been previously coated with a silicone release agent, giving a coating 30 to 40 micrometers thick. The coating is irradiated for 10 seconds under a 80 w/cm medium pressure mercury arc lamp at a distance of 220 mm. The resultant coating is hard and tack-free. To this coating are applied two layers of a prepreg as used in Example 1, the assembly is covered with a poly(tetrafluoroethylene) sheet and a vacuum is applied to hold the sheet onto the layers. The assembly is heated in an oven at 125° C. for 1 hour and separated from the mould, giving a cured, rigid moulding from which the coating cannot be removed.

EXAMPLE 4

Resin XI (40.0 parts), Resin XII (3.0 parts), 2-hydroxyethyl methacrylate (1.0 part) and benzil dimethyl ketal (0.25 part) are mixed at room temperature to give a clear solution. This is brushed onto a metal mould previously coated with a silicone release agent, leaving a coating 20 micrometers thick. The coating is irradiated for 20 seconds under a 80 w/cm medium pressure mercury arc lamp at a distance of 220 mm to solidify the coating and render it tack-free.

Sheet moulding compound is made by adding 30 parts of chopped strand glass fibre having a strand length of 50 mm to the solution used to form the coating, applying the resulting mixture to a siliconised vegetable parchment sheet to give a film 20 micrometers thick, covering the film with a second sheet of the parchment and irradiating the resulting assembly for 20 seconds on each side, using a 80 w/cm medium pressure mercury arc lamp at a distance of 220 mm, to give a fibre-reinforced, solid, heat-curable film, from which the parchment sheets are then removed.

Three layers of the sheet moulding compound are placed on the solidified coating in the mould. The resulting assembly is heated at 150° C. for 30 minutes and then separated from the mould, giving a cured moulding having a smooth coating which cannot be removed.

What is claimed is:

1. A process for the production of a coated, reinforced epoxide or phenolic moulding which comprises
   (i) applying to the surface of a mould a layer of a liquid composition comprising a photocurable residue and a residue having at least one epoxide group or phenolic hydroxyl group,
   (ii) exposing the said layer to actinic radiation until solidification occurs, thereby forming on said surface a solidified layer having a thermosettable residue which is an epoxide or phenolic resin,
   (iii) applying to the solidified layer, in either order or simultaneously, at least one layer of reinforcement and at least one layer of a thermosettable resin that is an epoxide or phenolic resin,
   (iv) heating the assembly to form a cured moulding and
   (v) removing the cured moulding from the mould.

2. A process according to claim 1, in which the composition comprises a solely photocurable resin with a solely thermosettable epoxide or phenolic resin; a dual-functional resin having, in the same molecule, at least one photocurable group and at least one epoxide or phenolic hydroxyl group, which resin photocures in stage (ii) to produce a thermosettable resin; a mixture of a said dual-functional resin and a solely photocurable resin or a solely thermosettable epoxide or phenolic resin; a mixture of a said dual-functional resin, a solely photocurable resin and a solely thermosettable epoxide or phenolic resin; or an epoxide resin or phenolic resin together with a curing agent which is activated by heat and a curing agent which is activated by actinic radiation.

3. A process according to claim 1, in which the resin used in stage (iii) is of the same type as the thermosettable resin used in stage (i) or produced in stage (ii).

4. A process according to claim 1, in which the photocurable resin has at least one unsaturated ester group of formula $$CH_2=C(R^1)COO— \quad\quad I$$

where $R^1$ represents a hydrogen, chlorine or bromine atom or an alkyl group of 1 to 4 carbon atoms.

5. A process according to claim 4, in which $R^1$ represents a hydrogen atom or a methyl group.

6. A process according to claim 4, in which the photocurable resin has at least two groups of formula I and a molecular weight of up to 10000.

7. A process according to claim 4, in which the photocurable resin is an acrylate or methacrylate of a monohydric alcohol or a full or partial ester of acrylic or methacrylic acid with a glycol or higher functional polyol, or a 2-hydroxypropyl ester formed by reaction of a compound containing one or more glycidyl groups with acrylic or methacrylic acid.

8. A process according to claim 1, in which the phenolic resin is a resole or novolak derived from phenol and formaldehyde; the epoxide resin is a diglycidyl ether of a dihydric phenol or alcohol, a polyglycidyl ether of a phenol-formaldehyde novolak or a bisphenol-formaldehyde novolak, or a N-glycidylated aromatic amine.

9. A process according to claim 1, in which the liquid composition contains a dual-functional resin having at least one 1,2-epoxide group or phenolic hydroxyl group and at least one substituted ester group of formula I.

10. A process according to claim 1, in which the liquid composition comprises an epoxide resin or a phenolic resin together with a curing agent therefor which is activated by actinic radiation.

11. A process according to claim 10, in which the curing agent is an aromatic iodonium, sulfonium, sulfoxonium or iodosyl salt or a ferrocenium salt.

12. A process according to claim 1, in which the liquid composition is irradiated in the presence of a catalyst which on irradiation gives an excited state which leads to the formation of free radicals.

13. A process according to claim 12, in which the catalyst is an alpha-halogen substituted acetophenone, a benzophenone, an O-alkoxycarbonyl derivative of an oxime of benzil or 1-phenylpropane-1,2-dione, a benzil ketal, a mixture of a phenothiazine dye or a quinoxaline with an electron donor, or a titanocene.

14. A process according to claim 1, in which a phenolic resole is used and cure is effected in the presence of an acidic curing agent, or in which a phenolic novolak is used and cure is effected in the presence of a formaldehyde donor.

15. A process according to claim 1, in which an epoxide resin is used together with a curing agent therefor which is an aromatic primary or secondary amine, an imidazole, an aromatic group-substituted urea, an amidine or a complex of boron trifluoride or trichloride with an aliphatic, cycloaliphatic, or heterocyclic amine.

16. A process according to claim 1, in which the reinforcement is in fibrous form.

17. A process according to claim 16, in which the fibrous reinforcement is in the form of loose fibres or a woven or nonwoven fabric.

18. A process according to claim 17, in which the reinforcement is pre-impregnated with the thermosettable resin.

19. A process according to claim 1, in which stage (ii) is effected with actinic radiation of wavelength 200–600 nm.

* * * * *